Feb. 22, 1949.  G. C. THOMAS, JR., ET AL  2,462,818
CABLE CONNECTOR
Filed Dec. 29, 1945

INVENTORS
GEORGE C. THOMAS, JR.
BY CARROLL A. BADEAU
James C. Ledbetter
ATTORNEY Patented Feb. 22, 1949

2,462,818

UNITED STATES PATENT OFFICE 2,462,818

CABLE CONNECTOR

George C. Thomas, Jr., Elizabeth, and Carroll A. Badeau, Westfield, N. J., assignors to The Thomas & Betts Co., Elizabeth, N. J., a corporation of New Jersey Application December 29, 1945, Serial No. 637,908

1 Claim. (Cl. 285—6.5)

This invention relates to electrical box and conduit fittings, and more particularly to a new and useful cable connector, which is sometimes referred to as a tangent clamp cable connector.

In one known type of cable connector, for use in installing armored cable in electrical wiring raceway installations, a clamping or set screw is mounted tangentially in pressure relation to a cable received into the connector and thus bears or clamps with a camming and crushing force against the wall of the cable with the result that the cable may be damaged when securing it within the connector and electrical box, and thus the parts may become loosened due to the damaged cable and failure of the assembly to impose a locking action on the set screw.

A second known type of electrical cable connector has its screw so arranged and mounted as to apply radial pressure centrally or diametrically of the armored cable and employs a protective shielding clamp between the screw end and the cable to prevent the crushing of the armor of the cable which frequently occurs in the first type of connector mentioned. However, loosening of the parts nevertheless may occur (the same as in the first type of cable connector above mentioned) due to the lack of imposing a locking action on the screw.

Both known species of electrical cable connectors above mentioned possess advantages, but neither one embodies the structural and operating merits of both types. Thus each conventional cable connector above mentioned is faulty in structure and mode of operation, and both connectors require skill and care if the workman on the job is to accomplish a permanent connection set up against loosening of parts.

A purpose of this invention is to produce a new electrical cable connector, requiring minimum skill and care in its installation, embodying certain features of both conventional types above mentioned which fully protects the cable, applies maximum clamping or squeezing pressure on the cable for securely fastening it in the connector as well as in the box, and of importance also is a screw threaded locking action which positively prevents loosening of the assembled parts in the electrical cable raceway system.

Tests of this new cable connector bear out the several foregoing purposes, and comparative tests of the prior art connectors above mentioned demonstrate that the problems and difficulties arising in their use are eliminated by the new construction and mode of operation of the new connector herein.

This description and the accompanying drawings explain the invention and indicate further purposes thereof, present it in a manner preferred at this time, demonstrate the features thereof in order to disclose the scope and principle of the invention, thus suggesting further examples of construction which may develop out of the teachings herein or which may occur to others who wish to avail themselves of the benefits of the invention, and also aid in understanding the problems sought to be solved.

Figure 7:
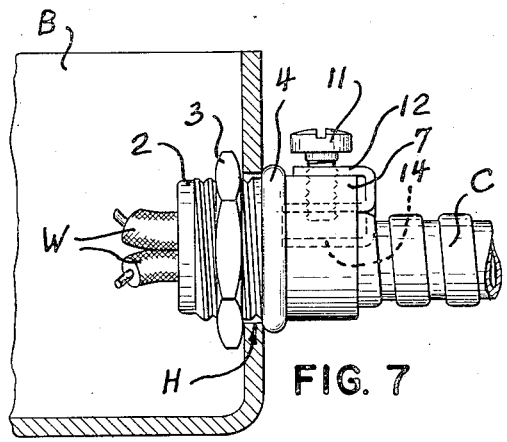
Fig. 7 shows a side elevation of the cable connector anchored in a knockout hole of an electrical box and securing a cable therein, the box being shown in section.
Figure 8:
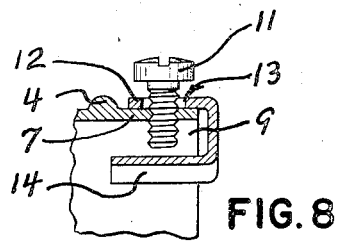
Fig. 8 is a fragmentary view taken on the line 8—8 and showing a free or clearance hole for a clamping set screw to pass through one portion of a clamping saddle or yoke constituting a feature of the invention.

Referring further to the drawings, there is shown one structural form of the invention as an example thereof. It will be noted that a tubular body has an inner end 2 which is threaded to receive a nut 3. An annular bead or flange 4 is formed on the connector body back of the screw threads. These parts, as pointed out on the drawings at 2, 3 and 4, may be regarded as a conventional example of one appropriate securing or anchorage means to fasten the connector 2, and hence an armored cable C as further described, within a knockout opening or hole H of a standard type of electrical box B (Fig. 7).

The nut 3 tightens against the inside wall surface of the box B and tightly draws the annular bead or shoulder 4 up against the outside of the box. Inasmuch as the invention relates to other features (presently described), it will be appreciated that the box and connector anchorage means 2, 3, 4 here shown is merely an example, and that other box fastening means as such for this new connector may be employed.

Coming now more particularly to the other features in question, that is, the new and useful structural combination possessing a new mode of operation for securing the armored cable C within the tubular body 2, it will be seen that the outer end of the connector body is shaped with a top portion 7 which may be flat, or partially so, and which intersects a straight side wall portion 9 of the body 2. These wall portions 7 and 9 merge with the tubular or cylindrical portion of the connector body.

Figure 1:
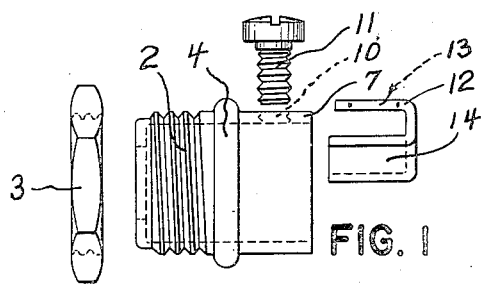
Fig. 1 shows a side elevation of the separate parts of the new cable connector placed in spaced alignment before assembly.
Figure 2:
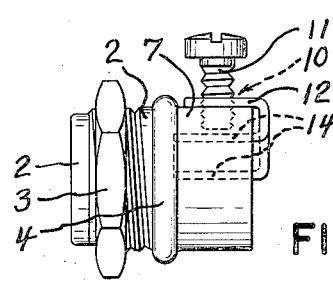
Fig. 2 shows the assembly thereof as a complete connector.

A threaded screw hole 10 (dotted in Fig. 1) is provided through the top or partially flat wall portion 7 and is located adjacent the straight side wall portion 9 of the tubular body 2 of the cable connector. This tapped screw hole 10 is offset from the center or axis of the tubular body, that is, offset from its cylindrical portion 2, and hence the axis of the screw hole 10 is tangent or nearly so with the outer cylindrical surface of the cable C which is adapted to be received into the connector body. Likewise, the axis of the threaded hole 10 is disposed parallel to the inner surface of the straight side wall 9.

Figure 3:
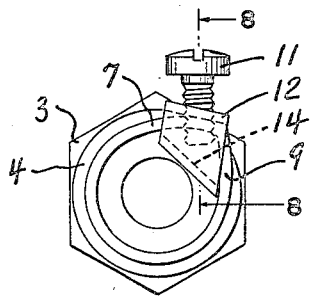
Fig. 3 shows an outer end elevation of the cable connector, that is, the cable receiving end thereof.
Figure 5:
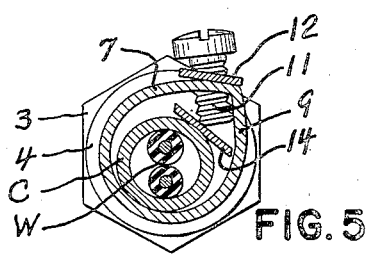
Fig. 5 shows a cross section on the line 5—5.
Figure 6:
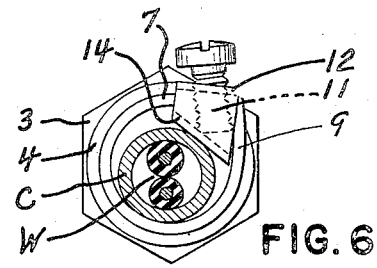
Fig. 6 shows a section on the line 6—6.

A clamping or set screw 11 is operatively carried in the threaded hole 10 and thus disposed alongside and parallel with the straight side wall portion 9 of the tubular body 2. When the screw 11 is free, that is, not under pressure (Fig. 3) it stands parallel to the body wall 9 and may have slight or no direct engagement with the inner surface of the straight wall portion 9. The action of this screw, when under pressure (Figs. 5 and 6), is important in connection with the novel mode of operation of the new cable connector herein.

A cable clamping saddle of yoke-like form has an outer flat portion constituting a retaining arm 12 provided with an unthreaded clearance aperture 13 through which the screw 11 freely passes. An integral inner portion of the saddle provides a clamping plate 14 set at an angle to the plane of the outer flat arm portion 12. The approximate angle shown gives good results but may vary somewhat in accordance with the new principles characterizing this invention. This clamping saddle 12, 14 constitutes a yoke, the two flat portions of which are spaced apart and disposed astride the outer edge of the body wall portion 7 adjacent the straight side wall 9.

It will be seen that the yoke-like clamping saddle 12, 14 has freedom of motion on its set screw 11 as well as upon the outer end 7 of the connector body. Thus the clamping saddle 12, 14 adjusts itself along the screw 11 and also to the entry of the cable C when mounting the connector on the end of such cable. This arrangement of parts slidably disposes the inner angular clamping plate 14 against the wall of the cable C for angular and tangent creeping or camming pressure against such cable and also locates the inner end of the screw for like action against the clamping plate 14.

Figure 4:
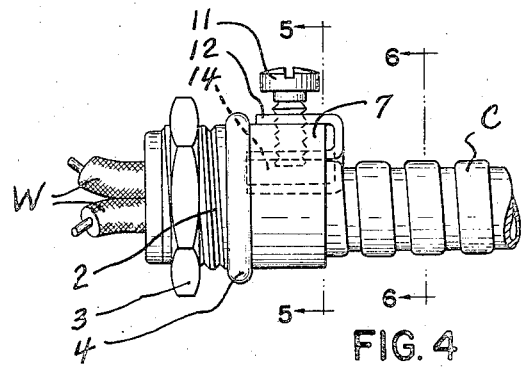
Fig. 4 shows a side elevation of the cable connector mounted on the end of a cable and clamped thereon preliminary to placing the assembled connector and cable in an electrical box.

In the installation of this new electrical cable connector, it may first be fastened in the box B (Fig. 7) as heretofore explained or mounted on the end of the cable C (Fig. 4), depending more or less upon the procedure of the workman on the job. In either event, the cable C is inserted all the way into the body 2 from its outer end 7, 9 and adjusted underneath the clamping plate 14, with the electrical conductor wires W extending into the box B. The set screw 11 then is screwed inwardly (Figs. 5 and 6), thus forcing its inner pressure end along the angular surface of the flat clamping plate 14.

The inner end of the screw 11 slides or cams along the angular plate 14, and the plate similarly creeps by a camming action against the cable C and exerts a squeezing action thereon. This action forces the cable to be clamped and seated under pressure within the connector body 2, that is, between the inner surface of the body and the clamping plate 14 of the screw-actuated clamping yoke 12, 14. The clamping yoke 12, 14 being preferably of malleable or comparatively soft sheet metal stock yields or gives to the pressure of the screw 11 and sets itself to the side or tangent clamping position enforced by the action of the screw.

Furthermore, the inner end of the screw 11 advances inwardly by a screw-wedging action into the angular space included within and between the straight side wall 9 and the relatively movable clamping plate 14. Such screw-wedging action tilts (Figs. 5 and 6) the screw 11 at an angle in its threaded screw hole 10 of the connector body and thus locks the screw against loosening action which otherwise might occur due to vibration and other conditions affecting electrical raceway installations.

It will be seen that this new cable connector possesses the advantage of adjusting itself to variations, if any, in given sizes of standard cable. This feature is due to the tangent or camming action of the clamping plate 14 which approaches side engagement and takes hold for applying its gripping squeeze despite the fact that the cable may be off size from a given standard for which the connector is manufactured. Thus the connector possesses a large tolerance range adapting it to several sizes of cable C.

The characteristic locking action imposed on the set screw 11, by virtue of the new arrangement of parts, is attained by a dual function, that is, the double locking hold on the screw 11 is applied at both ends thereof. Firstly, the locking action is applied on and in the threads of the screw hole 10 of the connector body 2 and, secondly, on the inner extremity of the screw where it buries and wedges itself into the angular seat between the clamping plate 14 and the straight side wall 9 of the connector body.

The securely permanent hold, which the connector 2 establishes with the armored cable C, is accomplished without damage to the cable since the tangent clamping plate 14 shields and protects the cable from the gripping pressure of the screw 11 and distributes the squeeze or pressure of the screw along the cable surface without likelihood of crushing or damaging it. Of major importance is the fact that, in this newly discovered mode of operation, the armor of the cable C is protected not only by the side shielding and squeezing function of the tangent clamping plate 14 but moreover is protected by the differential action of this new cable clamping means.

In other words, as the screw 11 rapidly advances inwardly, the camming action of the plate 14 against the cable is slightly slower than the screw and affords opportunity for the armor of the cable to slowly settle, yield and creep away from the screw pressure thus imposed. Accordingly, the clamping plate 14 does not impose a diametrical crushing or collapsing pressure on the armored wall of the cable C. This advantage is due to the fact that the angularity of said plate permits the rapid inward advance of the screw 11 to take place without transmitting all of its travel to said plate and cable C.

Thus by differential action, the long and rapid travel of the screw imparts a short and slow lateral squeezing or camming travel on the clamping plate 14 and hence the cable C. Consequently, the armor of the cable C has time to settle into ultimate position, and to absorb the screw pressure, without crushing or fracture. This is an important advantage in cable connectors.

The simplicity of the connector emphasizes its novel quality, in that the set screw 11 is self locking, at both extremities thereof, without addition of parts to effectuate such function, and without an operation by the workman other than tightening the screw 11 to make the installation. A minimum of skill and care is required in establishing this new cable connection due to the sliding tangent differential motion in the clamping action of the protective plate 14 and due to the creeping retreat which the cable C experiences when going under clamping pressure.

The disclosure herein explains the principle of the invention and presents the best mode contemplated in applying such principle, so as to distinguish the invention from others; and there is particularly pointed out and claimed, the part, improvement or combination, which constitutes the invention or discovery as understood by a comparison thereof with the prior art.

This invention is presented to fill the need for a useful cable connector. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:

A cable connector comprising a tubular body adapted to have its inner end anchored in an electrical-box hole and its outer end to receive a cable, a straight-wall portion formed in the outer end of the tubular body, a screw extending through a screw-threaded hole in said body and alongside the straight-wall portion toward one side of the cable, a yoke-like clamping saddle mounted astride the outer end wall of the body and freely movable in operative relation thereto, and including two spaced flat portions, one flat portion forming a retaining arm mounted on the outside of the body and having a clearance hole through which the screw extends to loosely retain the clamping saddle in its freely-movable operative position, the other flat portion forming a freely-movable clamping plate mounted inside the body at one side of the cable and being disposed in a plane at an angle to that of the retaining arm as well as at an angle to the axis of the screw, whereby the tightening of said screw cams the inner end thereof under pressure engagement against the angular surface of the clamping plate, thus forcing said plate against the cable and securing it within the tubular body.

GEORGE C. THOMAS, JR.
CARROLL A. BADEAU.

REFERENCES CITED

The following references are of record in the file of this patent:

UNITED STATES PATENTS

| Number | Name | Date |
| --- | --- | --- |
| 1,174,288 | Rosenfeld | Mar. 7, 1916 |
| 1,644,297 | Thomas | Oct. 4, 1927 |
| 1,789,915 | Thomas | Oct. 18, 1932 |
| 1,833,956 | Thomas | Dec. 1, 1931 |